(12) United States Patent
Han et al.

(10) Patent No.: US 7,949,360 B2
(45) Date of Patent: May 24, 2011

(54) METHOD AND APPARATUS FOR ADAPTIVELY ALLOCATING TRANSMISSION POWER FOR BEAM-FORMING COMBINED WITH OSTBCS IN A DISTRIBUTED WIRELESS COMMUNICATION SYSTEM

(75) Inventors: Shuangfeng Han, Suwon-si (KR); Yun-Je Oh, Yongin-si (KR); Seong-Taek Hwang, Pyeongtaek-si (KR); Byung-Jik Kim, Seongnam-si (KR); Han-Lim Lee, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 710 days.

(21) Appl. No.: 11/977,612

(22) Filed: Oct. 25, 2007

(65) Prior Publication Data

US 2008/0102881 A1    May 1, 2008

(30) Foreign Application Priority Data

Oct. 25, 2006 (KR) ........................ 10-2006-0104046

(51) Int. Cl.
*H03C 7/02* (2006.01)
*H04M 1/00* (2006.01)
*H04L 27/00* (2006.01)
*H01Q 3/00* (2006.01)
*H04B 7/185* (2006.01)
*H04B 7/02* (2006.01)
*H04B 7/00* (2006.01)
*H04B 1/02* (2006.01)
*H04B 17/00* (2006.01)
*H04B 1/66* (2006.01)
*H04B 3/46* (2006.01)

(52) U.S. Cl. ........ 455/522; 455/101; 455/102; 455/103; 455/562.1; 370/318; 375/227; 375/229; 342/372; 342/368; 342/371

(58) Field of Classification Search .................. 455/522, 455/101, 102, 103, 562.1; 370/318; 375/227, 375/229; 342/372, 368, 371
See application file for complete search history.

(56) References Cited

U.S. PATENT DOCUMENTS

| 7,205,937 | B2* | 4/2007 | Hein .............................. 342/372 |
| 7,545,323 | B2* | 6/2009 | Kalian et al. .................. 342/372 |
| 7,545,324 | B2* | 6/2009 | Kalian et al. .................. 342/372 |
| 7,711,330 | B2* | 5/2010 | Yang et al. ..................... 455/101 |
| 2003/0190897 | A1* | 10/2003 | Lei et al. ........................ 455/101 |
| 2004/0082356 | A1* | 4/2004 | Walton et al. ................. 455/522 |

(Continued)

FOREIGN PATENT DOCUMENTS

KR    2001-87715    9/2001

(Continued)

*Primary Examiner* — Edward Urban
*Assistant Examiner* — Bobbak Safaipour
(74) *Attorney, Agent, or Firm* — Cha & Reiter, LLC

(57) ABSTRACT

An apparatus that adaptively allocates transmission power for beam-forming combined with orthogonal space time block codes in a distributed wireless communication system, the apparatus including: sub-arrays for beam-forming, which are geographically distributed and each of which includes a plurality of distributed antennas placed in random groups. A central processing unit provides predetermined combinable power allocation schemes according to subsets in a plurality of the sub-arrays, identifying performances of the schemes by using information on large-scale fading of each of the sub-arrays fed back from a receiving party, setting a subset having best performance as an optimal subset according to the identified performances, and performing power allocation according thereto.

9 Claims, 5 Drawing Sheets

U.S. PATENT DOCUMENTS

| | | | |
|---|---|---|---|
| 2005/0207475 A1* | 9/2005 | Bar-Ness et al. | 375/141 |
| 2007/0096982 A1* | 5/2007 | Kalian et al. | 342/377 |
| 2008/0013638 A1* | 1/2008 | Walton et al. | 375/260 |
| 2008/0117961 A1* | 5/2008 | Han et al. | 375/227 |

FOREIGN PATENT DOCUMENTS

| | | |
|---|---|---|
| KR | 2002-41217 | 6/2002 |
| KR | 2004-04709 | 1/2004 |
| KR | 2006-63478 | 6/2006 |

* cited by examiner

METHOD AND APPARATUS FOR ADAPTIVELY ALLOCATING TRANSMISSION POWER FOR BEAM-FORMING COMBINED WITH OSTBCS IN A DISTRIBUTED WIRELESS COMMUNICATION SYSTEM

CLAIM OF PRIORITY

This application claims the benefit under 35 U.S.C. §119 (a) from an application entitled "Method Of Adaptively Allocating Transmission Power For Beam-forming Combined With Orthogonal Space Time Block Codes In Distributed Wireless Communication System," filed in the Korean Intellectual Property Office on Oct. 25, 2006 and assigned Ser. No. 2006-104046, the contents of which are hereby incorporated by reference in its entirety.

BACKGROUND OF THE INVENTION

1. Field of the Invention

The present invention relates to a distributed input-distributed output wireless communication system using a space-time coding technique. More particularly, the invention relates to a method of adaptively allocating transmission power for beam-forming combined with orthogonal space time block codes in a distributed wireless communication system.

2. Description of the Related Art

A relatively new development in wireless communication technologies includes a spatial multiplexing technology and a space-time coding technology. One particular type of the space-time coding is referred to as MIMO (Multiple Input Multiple Output), and allows a plurality of independent radio waves to be transmitted within the same frequency range at the same time by using multiple antennas in transmitting/receiving signals.

Fundamentally, MIMO technology is based on the use of a spatially distributed antenna and the generation of parallel spatial data streams within a common frequency band. The radio waves are transmitted in such a manner that although the individual signals transmitted have the same frequency, they are separated and demodulated in a receiver so as to produce a plurality of statistically independent (i.e., efficiently separate) communication channels. Accordingly, in contrast to a standard wireless communication system which inhibits a multi-path signal (i.e., a plurality of signals of the same frequency which is delayed in time and modified in amplitude and phase), the MIMO may depend on an almost non-correlative (or weakly correlative) multi-path signal in order to achieve an improved signal-to-noise ratio and a higher throughput within an appropriate frequency band.

One of the issues that is to be considered has to do with fading (i.e. fading channels). Fading channels refer to mathematical models for distortion that is experienced by a telecommunication signal over different types of propagation media. Mobile terminals are susceptible to momentary signal loss (fading) that can be corrected by moving the mobile terminal a short distance. The fading is caused by destructive interference often caused by multiple reflected copies of the signal with slightly different phases. In the past, it has been known to combat fading with multiple versions of the same signal that are received and combined, often with multiple antennas, a practice known as diversity.

In one specific application related to the MIMO type technology, a theoretical result presented from the following reference documents [1] and [2] (listed at the last page of the specification) below proved that a distributed antenna (DA) is more profitable than a co-located multiple input multiple output (C-MIMO) channel in terms of capacity. However, more thorough research has not yet been devoted to a method for obtaining enough advantages of the DA in terms of a capacity. With regard to creating a method of utilizing distributed antennas, there has been previously proposed a concept for a distributed wireless communication system (DWCS) in reference document [3] cited herein below, discussing that it is possible to process a transmit and receive signal together in the system, which can result in a large increase of system capacity.

In the DWCS, combining beam-forming with an orthogonal space time block codes (OSTBC) as disclosed in reference document [4] cited herein below, a very encouraging result is produced because of macro-diversity (from the DA), transmission/reception densities (from the OSTBC) and employment of an array gain (from the beam-forming). The same large-scale fading (i.e., shadowing and path-loss) scenario has been chiefly considered in the previous research related to this scheme. However, such large-scale fading, which occurs in a actual system, from a mobile terminal (MT) to the geographically distributed DA, may be greatly different than the research results, which implies that it is uneconomical to equally allocate the transmission power. Therefore, it is indispensable to allocate the transmission power based on channel state information (CSI).

FIG. 1 is a block diagram illustrating a basic construction of a transmission apparatus wherein the orthogonal space time block codes (OSTBC) and beam-forming are combined in a conventional distributed wireless communication system. Data symbols that are to be transmitted by a transmitting party are modulated in a predetermined modulation scheme (not shown) and are input into a space-time encoder 100 so as to be space-time encoded. Thereafter, the encoded data symbols are presented to a plurality of geographically distributed sub-arrays 111, and beam-forming is performed for the respective symbols. As illustrated in FIG. 1, transmission method for the OSTBC and beam-forming has been conventionally adopted on the following assumptions:

1) A base station antenna is separated among a part of the geographically distributed sub-arrays 111 for beam-forming. It is assumed that large-scale fading from a mobile terminal (MT) 120 to each sub-array 111 is the same.

2) A half-wavelength spacing is applied to antennas in each of the sub-arrays 111. There exists a single path from an MT 120 to each sub-array 111, and channels viewed by the antennas in given sub-arrays 111 are perfectly correlated by means of an array response vector. The array response vector can be estimated according to, for example, a feedback or other direction-of-arrival (DOA) estimation scheme.

3) A corresponding normalized array response vector is directly used as a beam-forming weight vector of a $j^{th}$ sub-array 111. A perfect beam-forming is assumed for the $j^{th}$ sub-array 111 so as to obtain the maximum aperture gain "$q_j$" (wherein the aperture gain may be regarded as an average increase of a signal power in a desired direction, which is achieved by the antenna array for one antenna, wherein an assumption is made that the overall transmission power in both the systems is the same).

4) The sub-arrays 111 are sufficiently separated from each other such that some degree of independent fading can occur in signals of each of the sub-arrays 111. In this case, each of the sub-arrays 111 may be considered to be an equivalent transmission unit.

Accordingly, transmission diversity can be obtained by applying the OSTBC to an equivalent unit. An equal power allocation scheme is adopted.

5) The channel is assumed to comprise a quasi-static flat Rayleigh fading channel.

6) The system is completely synchronized.

7) There exists only a single receiving antenna.

However, the following problems are known with regard to the conventional transmission method for the OSTBC and beam-forming, as shown in FIG. 1:

1) The Rayleigh fading is applied only to a none-line-of-sight (NLOS) communication scenario. However, owing to the distribution of the distributed antennas (DA), there may be some cases where a line-of-sight (LOS) signal exists in the DWCS. As a Nakagami fading is a more general fading model, the Nakagami fading must be considered instead.

2) Large-scale fading from a mobile terminal (MT) to the geographically distributed DA may be varied in actual systems as opposed to theoretical or ideal systems. Therefore, the equal power allocation scheme may result in an unacceptable level of performance. So, the transmission power must be optimally allocated in actual systems.

3) It is assumed that the number of antennas in each sub-array is the same. However, in an actual system, it would be necessary to adaptively configure the number of antennas of each sub-array in accordance with communication environments.

SUMMARY OF THE INVENTION

Accordingly, the present invention has been made in part to solve at least some of the above-mentioned problems occurring in the prior art. In addition, the present invention includes a method for providing an orthogonal space time block codes (OSTBC) and an optimal power allocation scheme for beam-forming in a distributed wireless communication system (DWCS) capable of optimally performing communications at a level heretofore unknown.

Also, the present invention provides a method for minimizing a given target capacity and outage probability related to a total transmission power by providing the OSTBC and an adaptive transmission power allocation scheme for beam-forming in a quasi-static Nakagami fading channel within the DWCS.

In accordance with another aspect of the present invention, there is provided an apparatus for a distributed wireless communication system which adaptively allocates transmission power for beam-forming that is combined with orthogonal space time block codes, the apparatus including: sub-arrays for beam-forming, which are geographically distributed, and each sub-array includes a plurality of distributed antennas arranged in random groups; and a central processing unit having modules for applying one or more predetermined combinable power allocation schemes according to subsets in a plurality of the sub-arrays, and for identifying performances of the schemes by using information on large-scale fading of each of the sub-arrays fed back from a receiving party, for setting a subset having a best performance as an optimal subset according to the identified performances, and for performing power allocation according thereto.

In accordance with still another aspect of the present invention, there is provided a method for adaptively allocating transmission power for beam-forming combined with orthogonal space time block codes in a distributed wireless communication system, the communication system including sub-arrays for beam-forming that are geographically distributed and each of which includes a plurality of distributed antennas arranged in random groups, the method including the steps of: estimating a direction-of-arrival (DOA) for each of the sub-arrays and creating an array response vector for each antenna sub-array; allocating transmission power proportional to a Nakagami fading parameter "m" for each of the sub-arrays according to subsets, which can be combined in a plurality of the sub-arrays, by receiving information on large-scale fading of each of the sub-arrays that is fed back from a receiving party, and calculating an outage probability according to each of the subsets; setting a subset of which the calculated outage probability is the lowest as an optimal subset, and performing power allocation according thereto.

In accordance with another aspect of the present invention, a transmission power allocation method is proposed that is based both on large-scale fading information (path-loss and shadowing) that is fed back from a receiver to a transmitter, and on an adaptive outage probability for transmission scheme for the OSTBC and beam-forming within a flat Nakagami fading channel.

Herein, a transmitter estimates a direction-of-arrival (DOA) of a mobile terminal (MT) for geographically distributed antenna sub-arrays, performs beam-forming within each of the sub-arrays, and achieves an array gain by using the estimated array response vector. A transmission diversity is obtained by transmitting an OSTBC symbol to the sub-array. The number of antennas relative to each sub-array must flexible in consideration of communication environments. In case of high density communication areas, more antennas can be placed in the sub-arrays. Further, the Nakagami fading parameter "m" for each of the sub-arrays is not necessarily equal.

In addition, a transmission antenna subset is a random combination of the sub-arrays. The best subset, where the power allocation is optimal, is selected in the power allocation scheme of the present invention. Additionally, a quasi-optimal power allocation scheme for a random transmission antenna subset allocates the transmission power proportional to Nakagami fading parameter "m" for each of the sub-arrays. The transmission power is very close to an optimal power allocation at sufficiently high transmission power level.

A subset including optimal outage performance for transmission, wherein the performance is close to the optimal performance at random transmission power level, is selected by choosing an antenna subset in accordance with the quasi-optimal power allocation to each of the antenna subsets.

BRIEF DESCRIPTION OF THE DRAWINGS

The above-disclosed and several other aspects, features and advantages of the present invention will become more apparent based on the following detailed description taken in conjunction with the accompanying drawings, in which.

DETAILED DESCRIPTION OF THE INVENTION

Hereinafter, an exemplary embodiment according to the present invention will be described with reference to the accompanying drawings. In the description herein below, many particular items are shown such as detailed components of an apparatus. However, a person of ordinary skill in the art appreciates that the detailed components are provided only to enhance the general understanding of the present invention, and not for purposes of limiting the invention. A person of ordinary skill in the art also understands that the present invention can be embodied without including such detailed components, and the invention may have many variations that are within the spirit of the invention and the scope of the appended claims.

Hereinafter, the features of the present invention will be described in more detail with reference to the accompanying drawings.

[System Model]

Figure 1:
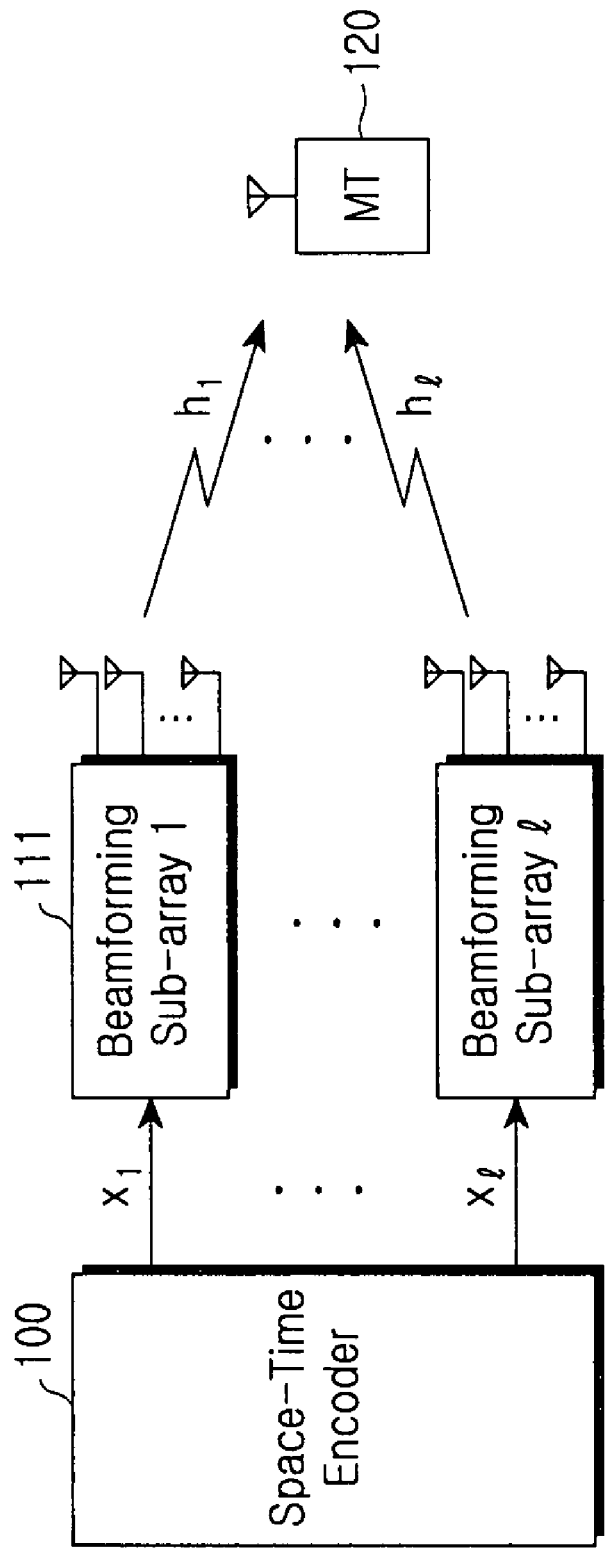
FIG. 1 is a block diagram illustrating the construction of a transmission apparatus where the orthogonal space time block codes (OSTBC) and beam-forming are combined in a conventional distributed wireless communication system.
Figure 2:
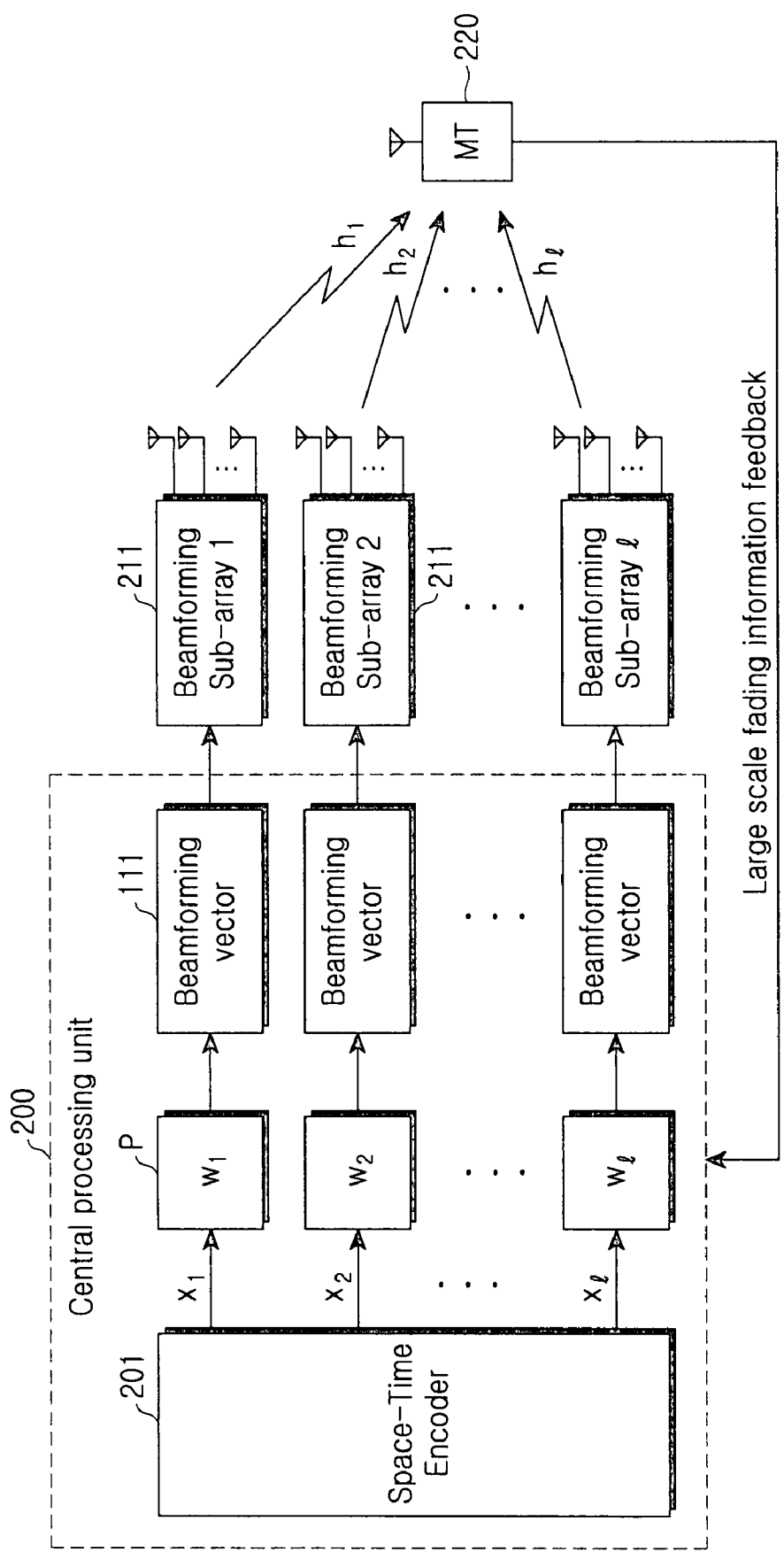
FIG. 2 is a block diagram illustrating an exemplary embodiment of the configuration of a transmission apparatus where the OSTBC and beam-forming are combined in a distributed wireless communication system according to the present invention.

FIG. 2 is a block diagram illustrating the configuration of a transmission apparatus according to an exemplary embodiment the present invention, wherein the OSTBC and beam-forming are combined in a distributed wireless communication system. A downlink single user $(n, l, q_1, \ldots, q_l, 1)$ DWCS is considered. As shown in FIG. 2, in the present invention, n number of distributed antennas (DAs) are placed in random groups in each of beam-forming sub-arrays 211 for forming "l" number of geographically distributed beams, $q_j$ DAs is placed in $j^{th}$ (where $j=1, 2, \ldots, l$) sub-array 211, $$\sum_{j=1}^{l} q_j = n,$$

a mobile terminal MT 220 includes one antenna. All beam-forming sub-arrays 211 are independently connected to a central processing unit 200 wherein a transmission signal and receiving signal of the DAs are processed. Generally, a macro and micro fading of different DA beam-forming sub-arrays 211 are mutually independent.

Half-wavelength spacing is employed to the distributed (direct) antennas in each of the sub-arrays 211 1 to l. There exists a single path from the MT 220 to each sub-array 211, and it is typically assumed that channels seen by the antennas in given sub-arrays 211 are perfectly correlated by an array response vector. The array response vector can be estimated according to the Direction-Of-Arrival (DOA) estimation scheme. A corresponding normalized array response vector is directly used as a beam-forming weight vector of a $j^{th}$ sub-array 211. A perfect beam-forming is assumed for the $j^{th}$ sub-array 211 so as to obtain the maximum aperture gain "$q_j$". In this case, each of the sub-arrays 211 may be considered to be an equivalent transmission unit. A transmission diversity can be obtained by applying the OSTBC to the equivalent transmission unit.

Still referring to FIG. 2, the central processing unit 200 first obtains an optimal transmission antenna subset (combination of antenna sub-arrays) including the optimal power allocation, and then the OSTBC symbol of unit average power is created by the space-time encoder 201, and before transmitting, the OSTBC symbol is multiplied first by a power allocation matrix "P". It is typically assumed that the power allocations within each of the sub-arrays 211 are equal. Therefore, the diagonal power allocation matrix "P" can be expressed by $P=\text{diag}(\sqrt{w_1},\sqrt{w_2}, \ldots, \sqrt{w_l})$, herein, $w_j$, where $j=1, \ldots, l$ corresponds to a power allocation weight for the $j^{th}$ sub-array, and $$\sum_{j=1}^{l} w_j = 1.$$

It is also typically assumed that the frequency of the channel is flat and a receiver is capable of using the perfect channel state information (CSI). The information on large-scale fading of each of the sub-arrays 211 is fed back to the receiving side.

Figure 3:
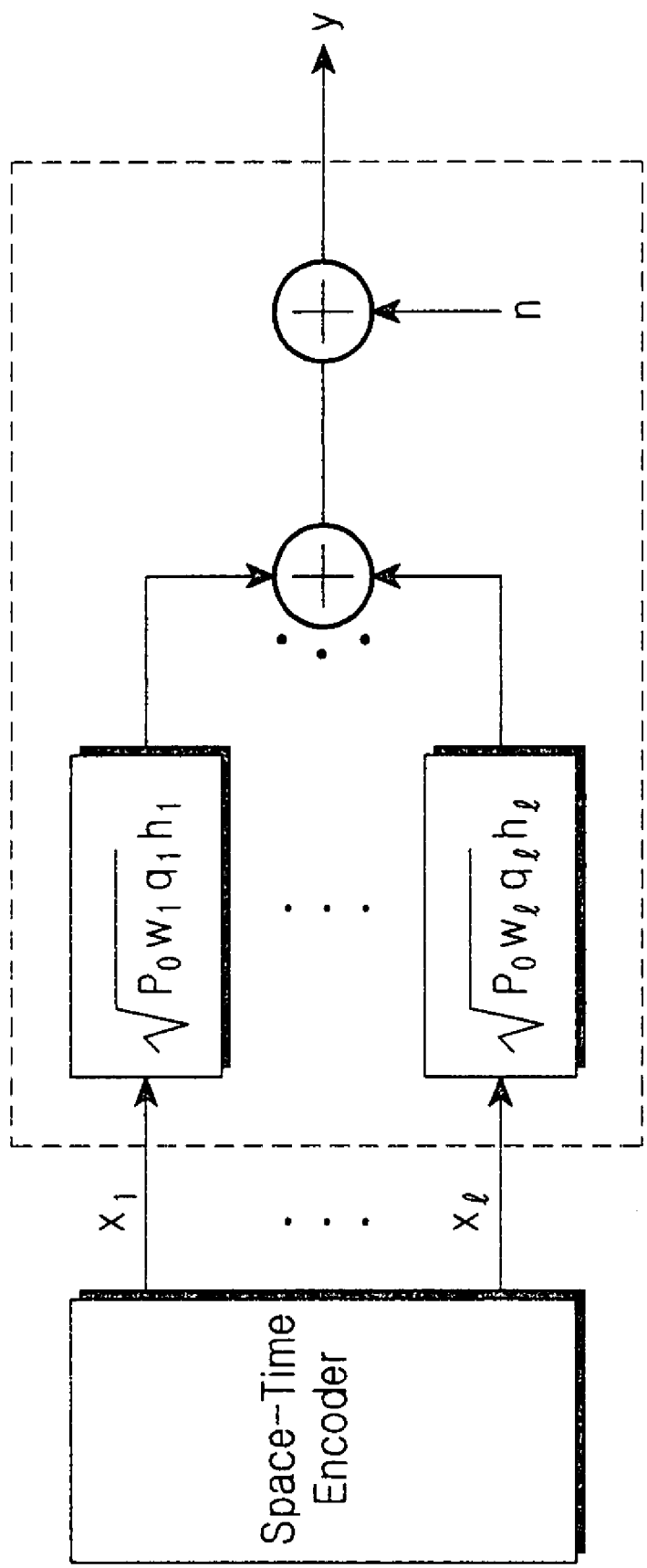
FIG. 3 is a view illustrating an example of a valid input and output relationship of the OSTBC transmission scheme in the distributed wireless communication system according to the present invention.

FIG. 3 illustrates a valid input and output relationship of the OSTBC transmission scheme in the distributed wireless communication system according to an exemplary embodiment of the present invention. Based on the illustration in FIG. 3, in the present invention, the valid input and output relationship can be expressed by the following Equation (1).

$$y=\sqrt{P_0}HBPx+n \qquad (1)$$

wherein y and x are receiving and transmission vectors, n is an m×1 noise vector including complex $N(0, \sigma^2)$ entries distributed to be independently identified, and $p_o$ is a total average transmission power. Accordingly, $$p_0/\sigma^2$$

results in a TSNR (transmit power to receive noise ratio) and denoted by "ρ". A diagonal matrix B corresponds to a beam-forming gain matrix and can be expressed by $B=\text{diag}(\sqrt{q_1}, \ldots, \sqrt{q_l})$. A channel gain from the $j^{th}$ transmission antenna sub-array to a receiver antenna $h_j$ results from $h_j=\beta_j e^{i\theta_j}$, where the $\theta_j$ is uniformly distributed through $[0, 2\pi]$. $\beta_j$ is Nakagami distributed random variable, and a probability density function (PDF) thereof is the following Equation (2).

$$f_{\beta_j}(x) = \frac{2}{\Gamma(m_j)}\left(\frac{m_j}{\Omega_j}\right)^{m_j} x^{2m_j-1} e^{-\frac{m_j}{\Omega_j}x^2}. \qquad (2)$$

wherein $\Omega_j=E(\beta_j^2)$ is an average power of $h_j$, and $m_j$ is Nakagami fading parameter. In general, $m_j \geq \frac{1}{2}$, which represents the seriousness of the fading. It is necessary to note that $\Omega_j$, where $j=1, \ldots, l$, corresponds to a large-scale fading for the $j^{th}$ antenna sub-array. It is typically assumed that the large-scale fading is notified to the transmitter through the feedback from the receiver. Since antennas share locations, it is typically assumed that the large-scale fading is equal in a usual point-to-point MIMO channel. However, the large-scale fading may be considerably varied due to the geographical distribution during actual transmission.

Note that Nakagami fading is the generally used term in the related art. "Short-term Fading" is the phenomenon of which the intensity of the electric wave received by the surrounding building or the reflected wave of the obstacle is so quickly changed. "Short-term Fading" can be called "Multi-path Fading" or "Rayleigh Fading". In particular, near the base station, the visibility range between the mobile stations is generated so that the direct wave and the reflective wave are exist at the same time. This phenomenon is called "Racian Fading". Nakagami fading is developed as the model for the expressing both Rayleigh Fading and Racian Fading.

The transmission antenna subset is defined as a random combination of DA sub-arrays. Herein, as the number of the sub-arrays is l, there exists $2^l-1$ subsets altogether, and these subsets are denoted by $A_1, \ldots, A_{2^l-1}$.

For example, a subset $A_l$ is assumed to include all l ports. A rate of the OSTBC is denoted by "r", where $r=n_s/T$, and $n_s$ independent data streams are transmitted during T consecutive symbol durations. Since the rates may differ from subset to subset, it is typically assumed that there is only one rate, i.e., $r_k$ (where $k=1, \ldots, 2^l-1$) for a subset $A_k$, for the sake of convenience.

[Outage Probability Induction]

In case of scheme for both the OSTBC and beam-forming in a quasi-static flat Nakagami fading channel, an outage probability will correspond to a measure of effective performance. Therefore, in the present invention, a power allocation scheme for optimizing transmissions through minimization of the outage probability is proposed. The outage probability of a subset $A_l$ of which a rate $r_l$ can be induced as follows.

A channel capacity can be expressed by $C=r_l\log(1+\eta)$, wherein $\eta$ is a detected signal-to-noise ratio (SNR) that can be induced by the following equation (3):

$$\eta = \|HBP\|_F^2 \rho = \sum_{j=1}^{l} \beta_j^2 w_j q_j \rho = \sum_{j=1}^{l} \eta_j. \tag{3}$$

where $\eta_j$ corresponds to a gamma distribution random variable. The PDF of $\eta_j$ is the following Equation (4):

$$f_{\eta_j}(x) = \frac{1}{\Gamma(m_j)} \left(\frac{m_j}{\Omega_j w_j q_j \rho}\right)^{m_j} x^{m_j-1} e^{-\frac{m_j}{\Omega_j w_j q_j \rho} x}. \tag{4}$$

An MGF of $\eta$ is induced by the following Equation (5):

$$\Phi_\eta(s) = \prod_{j=1}^{l} \Phi_{\eta_j}(s) = \prod_{j=1}^{l} (1 - si\Omega_j w_j q_j \rho/m_j)^{-m_j} \tag{5}$$

$$= \sum_{j=1}^{l} \sum_{k=1}^{m_j} T_{j,k}(1 - si\Omega_j w_j q_j \rho/m_j)^{-k}.$$

A coefficient $q_{j,k}$ in Equation (5) can be obtained by performing a partial fraction.

$$T_{j,k} = \frac{(-i\Omega_j w_j q_j \rho/m_j)^{-(m_j-k)}}{(m_j-k)!} \frac{\partial^{m_j-k}}{\partial s^{m_j-k}} \tag{6}$$

$$\left(\prod_{u=1,u\neq j}^{l} \left(1 - \frac{si\Omega_u w_u q_u \rho}{m_u}\right)^{-m_u}\right)_{s=\frac{m_j}{i\Omega_j w_j q_j \rho}}.$$

Therefore, the PDF of $\eta$ can be obtained through inverse transformation into $\Phi_\eta(s)$.

$$f_\eta(x) = \sum_{j=1}^{l} \sum_{k=1}^{m_j} \frac{1}{\Gamma(k)} T_{j,k}(\Omega_j w_j q_j \rho/m_j)^{-k} x^{k-1} e^{-xm_j/\Omega_j w_j q_j \rho}. \tag{7}$$

Eventually, the outage probability $P_o$ of which the data rate is R can be calculated by the following Equation (8):

$$P_o = P(C < R) = P(\eta < 2^{R/r_l} - 1) = \int_0^{2^{R/r_l}-1} f_\eta(x) dx \tag{8}$$

$$= \sum_{j=1}^{l} \sum_{k=1}^{m_j} \frac{T_{j,k}}{\Gamma(k)} \Gamma\left(k, \frac{(2^{R/r_s} - 1)m_j}{\Omega_j w_j q_j \rho}\right).$$

Also, the outage probability is obtainable in the case of the OSTBC which is transmitted through other random subsets. One way that the outage probability can be minimized is by allocating the power to each of the subsets and selecting the subset of which outage performance is the best for transmission. However, directly minimizing the outage probability is difficult, so the following quasi-optimal scheme is adopted.

[Antenna Subset Selection Using Quasi-Optimal Power Allocation Scheme]

Mutually different subsets can be used for the optimal transmission of the OSTBC at mutually different TSNR levels. It is assumed that there exists a subset $A_l$ having positive weights, i.e., $w_1, \ldots, w_l$ at the TSNR level $\rho$. The optimal outage probability $P_{o,A_l}^{opt}$ can be expressed as the following Equation (9) in relation to $\Phi_\eta(s)$:

$$P_{o,A_l}^{opt} = \int_0^{2^{R/r_l}-1} f_\eta(x) dx = \int_0^{2^{R/r_l}-1} \left(\int_{-\infty}^{+\infty} \Phi_\eta(s) e^{-isx} ds\right) dx \leq \tag{9}$$

$$\int_0^{2^{R/r_l}-1} \prod_{j=1}^{l} \left(\int_{-\infty}^{+\infty} (1 - si\Omega_j w_j q_j \rho/m_j)^{-lm_j} e^{-isx} ds\right)^{1/l} dx$$

$$= \int_0^{2^{R/r_l}-1} x^{\sum_{j=1}^{l} m_j - 1} \prod_{j=1}^{l} (\Gamma(lm_j))^{-1/l} (\Omega_j w_j q_j \rho/m_j)^{-m_j}$$

$$e^{\frac{m_j x}{\Omega_j w_j q_j \rho} \frac{1}{l}} dx$$

Hölder's integral inequality is applied to the inequality in Equation (9). For $x \geq 0$, $e^{-x} \leq 1$ is deduced, and the upper bound can be induced as following Equation (10):

$$P_{o,A_l}^{opt} \leq \left(\frac{2^{R/r_l} - 1}{\rho}\right)^{\sum_{j=1}^{l} m_j} \left(\sum_{j=1}^{l} m_j\right)^{-1} \prod_{j=1}^{l} (\Gamma(lm_j))^{-1/l} \tag{10}$$

$$\left(\frac{\Omega_j q_j w_j}{m_j}\right)^{-m_j}.$$

A quasi-optimal power allocation vector $w^* = [w_1^*, \ldots, w_l^*]$ can be obtained by minimizing the $P_{o,A_l}^{ub}$, which corresponds to an optimization problem as following Equation (11):

$$w^* = \arg\max \prod_{j=1}^{l} (w_j)^{m_j}, \text{ subject to } \sum_{j=1}^{l} w_j = 1. \qquad (11)$$

$w_j^*$ is can be obtained by using Lagrangian method through the following Equation (12)

$$w_j^* = m_j \bigg/ \sum_{j=1}^{l} m_j, \quad j = 1, \ldots, l. \qquad (12)$$

The power allocation scheme is correct in the high TSNR area because the $P_{o,A_l}^{ub}$ is dense when the ρ is enough large. If Equation (12) is input to Equation (8), a quasi-optimal outage probability $P_{o,A_l}^{ub}$ can be calculated. When the method above is applied to a random optimal antenna subset, a similar quasi-optimal power allocation scheme can be easily obtained, which provides for allocating the transmission power proportional to a fading parameter "m" of the each sub-array (m being a Nagakami fading parameter).

Figure 4:
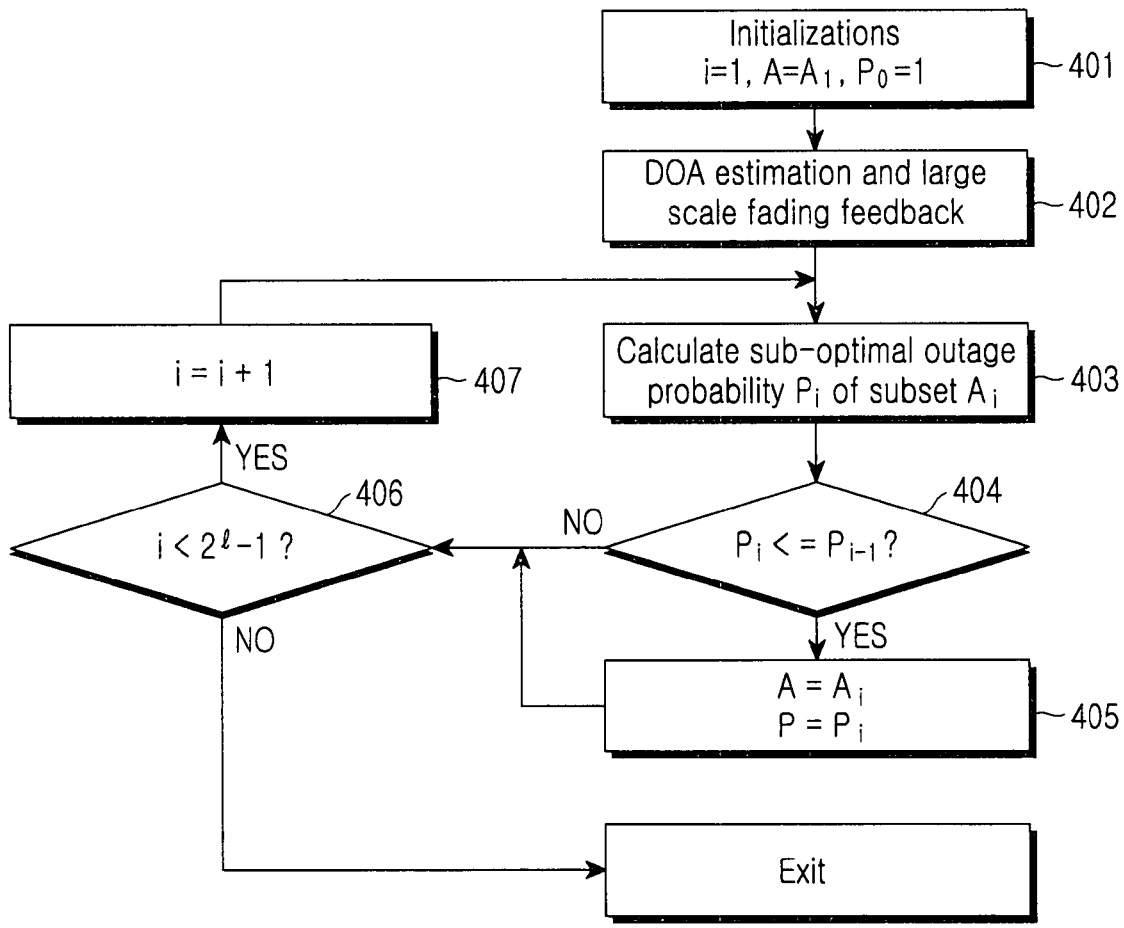
FIG. 4 is a flowchart illustrating examples of the operations of an adaptive transmission power allocation for the OSTBC and beam-forming in a wireless communication system according to the present invention.

FIG. 4 is a flowchart illustrating operations of an adaptive transmission power allocation for the OSTBC and beam-forming in a wireless communication system according to an exemplary embodiment of the present invention. As illustrated in the flowchart of the power allocation scheme shown in FIG. 4, in order to obtain the optimal subset, At step 401, there is an initialization performed. That is to say, i, A, P and $P_0$, are set to i=1, A=$A_i$, P=$P_0$=1 respectively, where A represents an optimal antenna subset, and P represents an optimal outage probability (i.e., a quasi-optimal outage probability in the present invention).

Next, at step 402, there is an estimation of the direction-of-arrival (DOA) for each of the sub-arrays, and creating the array response vector for each antenna sub-array. Herein, it is also typically assumed that large-scale fading information is fed back to the receiver by the mobile terminal (MT), and the MT is provided with the information.

At step 403, there is a calculation of the quasi-optimal outage probability $P_i$ for the subset $A_i$ by using the quasi-optimal power allocation scheme for allocating the transmission power proportional to the fading parameter "m" of each sub-array of the subset $A_i$.

At step 404, there is a decision made, in which it must be identified that the calculated outage probability $P_i$ is equal to or less than $P_{i-1}$, if $P_i \leq P_{i-1}$, then at step 405 A and P are set to $A_i$ and $P_i$ respectively. According to the process above, the optimal (i.e., the minimum value) outage probability is identified among outage probabilities based on each subset, and subset which corresponds to the outage probability can be identified.

Thereafter, at step 406, it is determined whether i<$2^l$−1, if i<$2^l$−1, then if yes, at step 407 add i to 1(i.e., i=i+1) and perform repeated calculating operations of the outage probability in the corresponding subset. If at step 406, i≧$2^l$−1 (the "No" leg), then terminate the program and output A and P.

[Numerical Result]

In order to examine the performance of the scheme according to the present invention, for example, four distributed (direct) antennas (DAs) are grouped into two sub-arrays, the receiver includes one antenna, normalized large-scale fading are $\Omega_1$=1 and $\Omega_2$=0.2 and DA topology of which (n, l, $q_1, \ldots, q_l$, 1) corresponds to (4, 2, 2, 2, 1) is considered. The target capacity is 3 bits/s/Hz. The parameters of number of "m" for sub-array 1 and sub-array 2 are 1 and 2 respectively.

The antenna sub-array includes $A_1$(sub-array 1), $A_2$(sub-array 2) and $A_3$(2 sub-arrays). The OSTBC of the largest rate (rate 1) is transmitted to $A_3$, and a pure(or intact or something else . . . which is better?) beam-forming is applied to $A_1$ and $A_2$.

Figure 5:
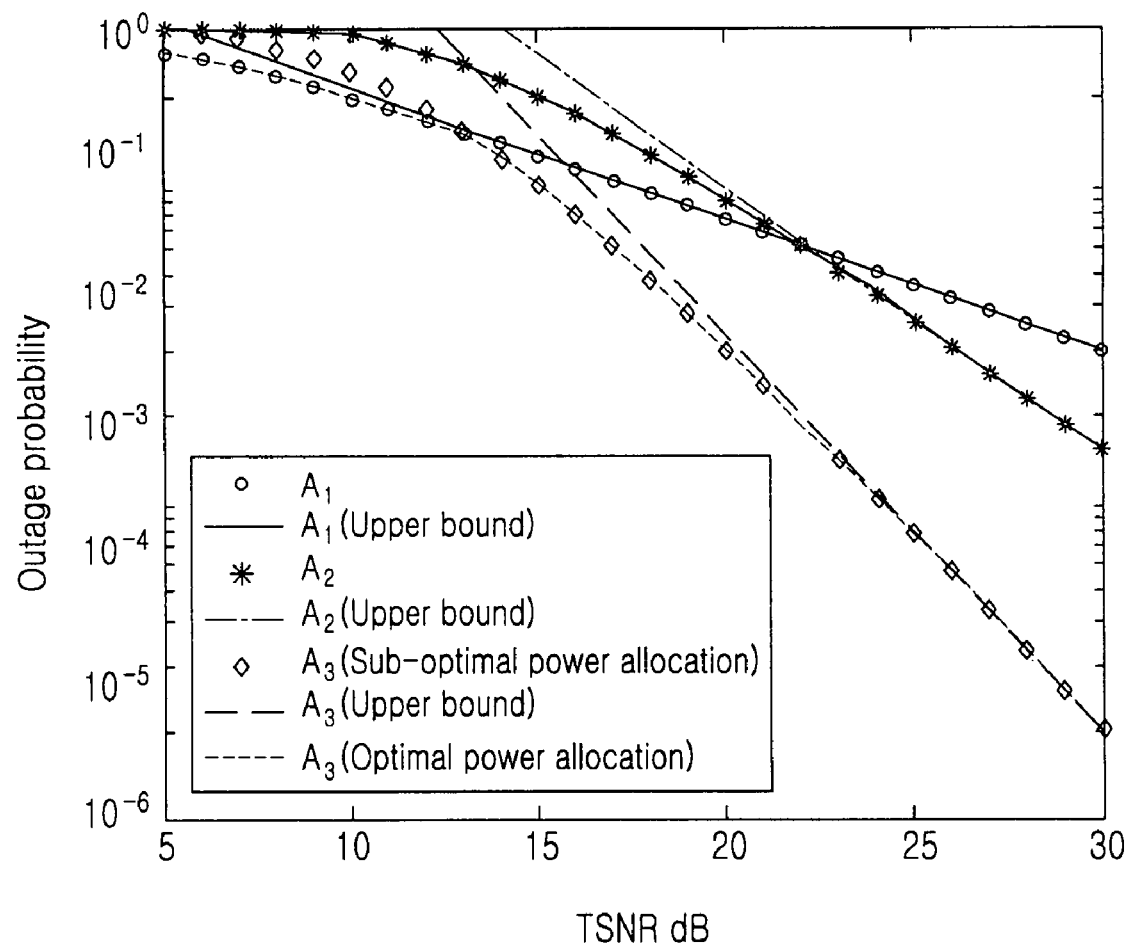
FIG. 5 is a view illustrating a performance characteristic graph of an adaptive transmission power allocation for the OSTBC and beam-forming in a wireless communication system according to an exemplary embodiment of the present invention.

FIG. 5 illustrates outage probabilities of $A_1$, $A_2$ and $A_3$ in case of the quasi-optimal power allocation (i.e., a third power is allocated to the sub-array 1 and two thirds power is allocated to the sub-array 2), and an optimal probability of $A_3$ in case of the optimal power allocation through a numerical optimization. In the case of the quasi-optimal power allocation, the upper bound of outage probabilities of $A_1$, $A_2$ and $A_3$ is also illustrated in FIG. 5.

As illustrated in FIG. 5, it is observed that the upper bound at the high TSNR level is dense. Also, the quasi-optimal performance of $A_3$ at the high TSNR level is very close to the optimal performance.

Still referring to FIG. 5, when the TSNR is less than 12 dB, the beam-forming on the $A_1$ is the best. When the TSNR is over 22.5 dB, beam-forming performance on the $A_2$ is better than on the $A_1$. When the TSNR exceeds 12 dB, it is the best to combine the OSTBC on the $A_2$ with beam-forming. The quasi-optimal performance according to the antennal selection is close to the optimum at random TSNR level.

Thus, in accordance with the graph shown in FIG. 5, it is shown that compared with the pure beam-forming on the $A_1$, the advantage in terms of performance of the power allocation scheme according to the present invention is clear. That is, the TSNR at $10^{-2}$ and $10^{-3}$ outage level are decreased by 6 dB and 7 dB respectively.

As mentioned above, according to the present invention, it is possible to perform the outage transmission power allocation operation for the OSTBC for the beam-forming in the DWCS.

As described above, by assuming that a large-scale fading occurs in a transmitter, an adaptive quasi-optimal power allocation scheme for the OSTBC and beam-forming in the flat Nakagami fading channel within the DWCS is proposed in the present invention for the purpose of minimizing the outage probability. When the large-scale fading information is changed, the power allocation may be varied according to an information change.

Since the large-scale fading changes over a large scale of time, the large-scale fading is very limited with a feedback over in the present invention. Additionally, proposed is a very simple but effective quasi-optimal power allocation scheme. According to the scheme, a transmission power is allocated, which is proportional to the fading parameter of each particular sub-array. The power allocation scheme is correct in the high transmission power area.

It has been proven by the exemplary embodiments of the present invention that a performance in selection of antennas is very close to the optimal performance of a quasi-static fading environment at random transmission power level. Compared with a pure beam-forming scheme in one sub-array out of sub-arrays, very large performance gain can be obtained according to the present invention.

In accordance with all of the aforementioned discussion, it is also possible to obtain the macro-diversity gain, the maximum diversity gain, and array gain through the OSTBC and beam-forming scheme of the present invention, in which the transmission power allocation is adaptively performed. The scheme according to the present invention is also expected to be widely applied to 3G or 4G wireless communication systems.

While the invention has been shown and described with reference to certain exemplary embodiments thereof, it will be understood by those skilled in the art that various changes in form and details may be made therein without departing from the spirit and scope of the invention as defined by the appended claims.

The following six references documents are all incorporated by reference in their entirety as background material:

[1] W. Roh and A. Paulraj, "MIMO Channel Capacity for the Distributed Antenna Systems," in Proc. IEEE VTC'02, vol. 2, pp. 706-709, (2002).

[2] H. Zhuang, L. Dai, L. Xiao and Y. Yao, "Spectral Efficiency of Distributed Antenna System with Random Antenna Layout," Electronics Letters, Vol. 39, No. 6, pp. 495-496, (2003).

[3] S. Zhou, M. Zhao, X. Xu, J. Wang, and Y. Yao, "Distributed Wireless Communication System: A New Architecture for Future Public Wireless Access," IEEE Com Mag., Vol. 41, No. 3, pp 108-113, (2003).

[4] V. Tarokh, H. Jafarkhani, and A. R. Calderbank, "Space-time Block Codes from Orthogonal Designs," IEEE Trans. Inform. Theory, vol. 45, pp. 1456-1467, (July 1999).

[5] P. Li, L. R. Zhang and H. C. So, "On a Combined Beam-forming/Space-Time Coding," IEEE Comm. Letters, Vol. 8, No. 1, pp. 15-17, (January 2004).

[6] R. W. Heath Jr. and A. Paulraj, "Multiple Antenna Arrays for Transmitter Diversity and Space-Time Coding," in Proc. IEEE Int. Conference on Communications (ICC'99), vol. 1, pp. 3640, (June 1999).

[7] M.-S. Alouini and M. K. Simon, "Performance of coherent receivers with hybrid SC/MRC over Nakagami-fading channels," *IEEE Trans. Veh. Technol.*, vol. 48, pp. 1155.1164, July 1999.

[8] R. Annavajjala, A. Chockalingam, and L. B. Milstein, "Performance analysis of coded communication systems on Nakagami fading channels with selection combining diversity," *IEEE Trans. Commun.*, vol. 52, no. 7, pp. 1214.1220, July 2004.

What is claimed is:

1. An apparatus for adaptively allocating transmission power for beam-forming combined with orthogonal space time block codes in a distributed wireless communication system, the apparatus comprising:
   a plurality of sub-arrays for beam-forming, which are geographically distributed and each of which comprises a respectively plurality of distributed antennas arranged in random groups; and
   a central processing unit for applying predetermined combinable power allocation schemes according to subsets in a plurality of the sub-arrays, for identifying performances of the schemes by using information on large-scale fading of cach of the sub-arrays fed back from a receiving party, for setting a subset comprising a best performance as an optimal subset according to the identified performances, and performing power allocation according thereto;
   wherein the subsets are a random combination of the sub-arrays, and
   wherein the predetermined power allocation scheme allocates the transmission power proportional to a Nakagami fading parameter "m" for each of the sub-arrays.

2. The adaptive transmission power allocation apparatus as recited in claim 1, wherein the determination of performances comprises a determination of an outage probability, and setting a subset of which the determined outage probability is a lowest to the optimal subset.

3. The apparatus according to claim 1, wherein the beam-forming sub-arrays are independently connected to said central processing unit, wherein a transmission signal and receiving signal of the distributed antennas are processed.

4. The apparatus according to claim 2, wherein a macro and a micro fading of different beam-forming sub-arrays are mutually independent.

5. The apparatus according to claim 3, wherein the distributed antennas are arranged with half-wavelength spacing in each of the sub-arrays.

6. A method for adaptively allocating transmission power for beam-forming combined with one or more orthogonal space time block codes in a distributed wireless communication system comprising sub-arrays for beam-forming which are geographically distributed and each of which comprises a plurality of distributed antennas arranged in random groups, the method comprising the steps of:
   estimating a direction-of-arrival (DOA) for each of the sub-arrays and creating an array response vector for each antenna sub-array;
   allocating transmission power proportional to a Nakagami fading parameter "m" for each of a plurality of subsets by using information regarding large-scale fading of each of the sub-arrays that is fed back from a receiving party and calculating the outage probability according to each. of the subsets; and
   setting a subset, of which the calculated outage probability is a lowest, as an optimal subset and performing power allocation according thereto;
   wherein the subsets are a random combination of the sub-arrays.

7. The method according to claim 6, wherein calculating the outage probability includes calculating a quasi-optimal outage probability $P_i$ for a subset $A_i$ by using a quasi-optimal power allocation scheme for allocating the transmission power proportional to the fading parameter "m" of each sub-array of the subset $A_i$, wherein A represents an optimal antenna subset, and P represents a quasi-optimal outage probability.

8. The method according to claim 7, wherein the estimating a direction-of-arrival (DOA) for each of the sub-arrays, and creating the array response vector for each antenna sub-array includes receiving large-scale fading information being fed back to the receiving party by a mobile terminal (MT) which is provided with the large-scale fading information.

9. The method according to claim 8, wherein calculating the outage probability $P_i$ includes determining when $P_i \leq P_{i-1}$, in which A and P are then set to $A_i$ and $P_i$ respectively.

* * * * *